Jan. 15, 1963 C. W. MERTZ 3,073,808
PROCESS FOR CONTROLLING O₂ CONTENT DURING POLYMERIZATION
Filed Sept. 13, 1954 3 Sheets-Sheet 1

FIG. I.

INVENTOR.
C.W. MERTZ
BY Hudson & Young
ATTORNEYS

INVENTOR.
C. W. MERTZ

United States Patent Office 3,073,808
Patented Jan. 15, 1963

3,073,808
PROCESS FOR CONTROLLING O₂ CONTENT DURING POLYMERIZATION
Clyde W. Mertz, Bartlesville, Okla., assignor to Phillips Petroleum Company, a corporation of Delaware
Filed Sept. 13, 1954, Ser. No. 455,612
7 Claims. (Cl. 260—82.1)

This invention relates to the polymerization of unsaturated organic compounds capable of undergoing an addition polymerization to form high molecular weight polymers. In another aspect it relates to the removal of oxygen from hydrocarbon streams. In still another aspect it relates to a control system to modify polymerization recipes in response to a determination of the oxygen present in the materials being reacted.

Numerous recipes have been developed for carrying out emulsion polymerization reactions to yield products possessing rubber-like characteristics. Certain advantages have been achieved through the use of catalyst systems comprising selected combinations of oxidizing and reducing agents, which together with an oxidation-reduction catalyst, serve as initiators of polymerization. These combinations are frequently referred to as redox systems and comprise an oxidant, such as an inorganic or organic peroxide; a reductant such as a polyhydroxy compound; and an activator, or oxidation-reduction catalyst, comprising a compound of a metal, such as iron, manganese, copper, vanadium, cobalt, silver, etc. The metal compound may be in the form of a complex, such as a porphyrin. In general it is assumed that the metal element must be in such a condition that it can change its valence state reversibly. For an example, iron is suggested. This metal can pass readily from the two-valent ferrous state to the three-valent ferric state and vice versa, by simply losing (or gaining, to go in the reverse direction) a valence electron. It is also evident that a compound such as ferrous sulfate might combine the dual role of a reductant and an oxidation catalyst.

In a system employing a peroxide or hydroperoxide as the oxidant, one commonly used activator is iron pyrophosphate which is prepared by the addition of a ferrous salt to an aqueous solution of sodium pyrophosphate.

It is known that the initiator forms a very important part of the recipe. Furthermore, it has been discovered that the presence of oxygen in the materials being polymerized is detrimental to the rate of polymerization, particularly when the reaction is carried out at low temperatures. When polymerizations of this type are carried out on a commercial scale, oxygen normally is present in small amounts in the butadiene which commonly forms one of the monomers employed in producing synthetic rubber. It is common practice to employ a mixture of fresh butadiene and unreacted recycled butadiene, and it is almost impossible to prevent oxygen from being introduced in small amounts in the recycled stream. However, this oxygen can be removed from the butadiene for the most part by scrubbing with certain oxygen removing agents, such as tertiary butyl catechol or sodium hydrosulfite. Such oxygen removing agents are for the most part rather expensive and, accordingly, must be used in the most economical manner possible.

It has been discovered that the oxygen removed from a butadiene stream is a function of the tertiary butyl catechol added to the butadiene. In accordance with this invention a sample stream is removed continuously from the effluent butadiene stream and analyzed automatically to determine the concentration of oxygen therein. The output signal from the analyzer is applied through suitable control mechanism to regulate the rate of addition of oxygen removing agent to the caustic scrubber. In this manner the oxygen content in the butadiene usually can be maintained within acceptable limits. However, if oxygen is present in the butadiene in greater amounts than can conveniently be removed by the addition of oxygen removing agents, an auxiliary control system is provided to modify the polymerization recipe to compensate for the presence of oxygen. When employing certain initiator systems, a definite correlation exists between the amount of activator required in the polymerization recipe and the oxygen present in the materials being reacted. In general, the amount of activator is increased to compensate for an increase in oxygen. This is accomplished in an automatic manner by regulating the activator added to the recipe in response to the output signal from the oxygen analyzer.

Accordingly, it is an object of this invention to provide an improved method of copolymerizing unsaturated hydrocarbons to produce synthetic rubber.

Another object is to provide a method of and apparatus for controlling the removal of oxygen from hydrocarbon streams by regulating the addition of an oxygen removing agent.

A further object is to provide a method of and apparatus for modifying polymerization recipes by varying the amount of activator in response to a measurement of the oxygen present in the materials being reacted.

Other objects, advantages and features of this invention should become apparent from the detailed description to follow in conjunction with the accompanying drawing in which.

Figure 1:
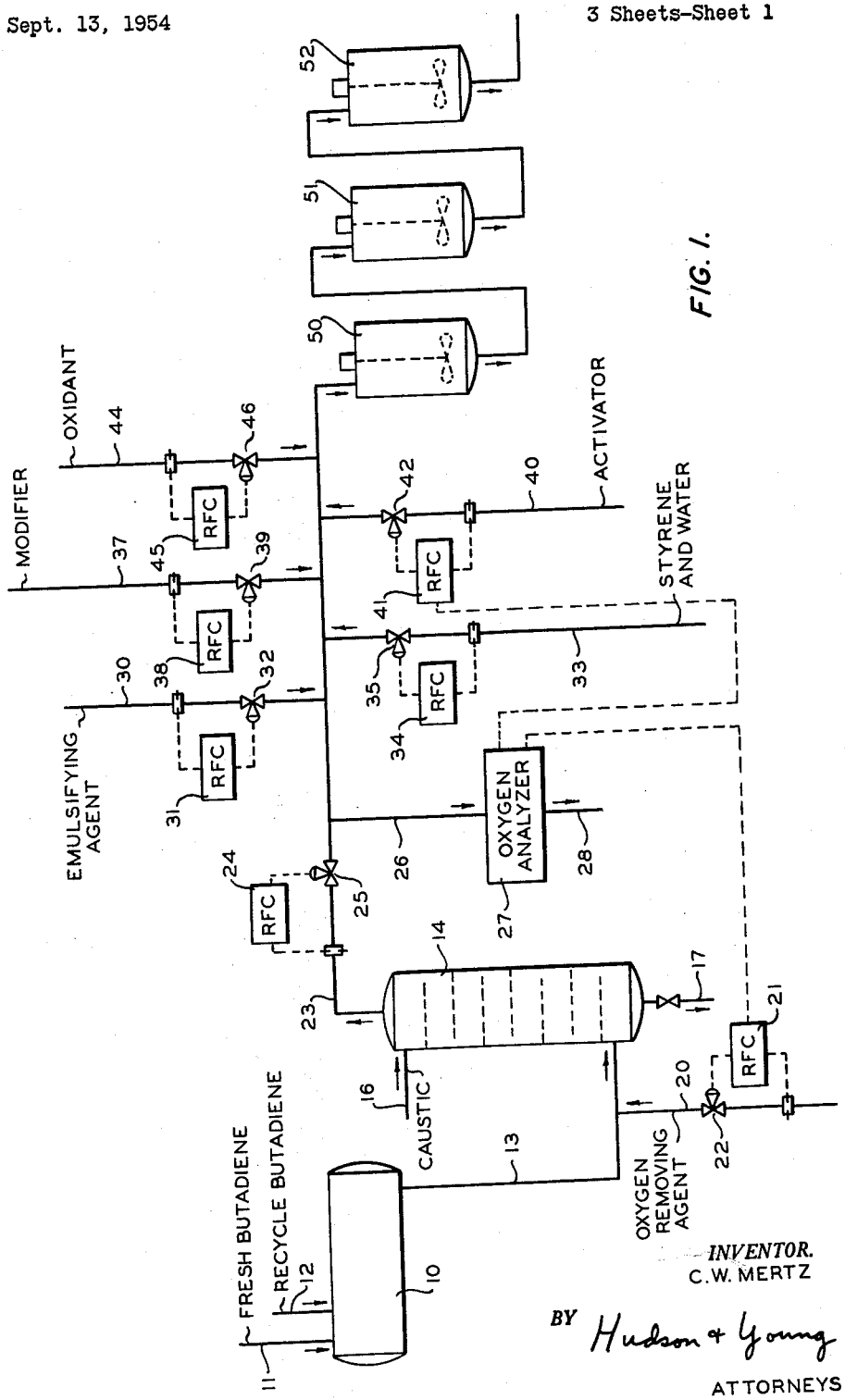
FIGURE 1 is a schematic representation of a polymerization system having the control apparatus of the present invention incorporated therein.

The polymerization recipes to which this invention is applicable include, generally, a conjugated monomeric diene which can be either a conjugated diene alone or together with an unsaturated organic material copolymerizable therewith, water, a modifier, an oxidant (a hydroperoxide), an emulsifier and an activator comprising an alkali metal pyrophosphate and ferrous sulfate heptahydrate.

The monomeric material polymerized to produce latices by the process of this invention thus comprises unsaturated organic compounds which generally have the characteristic structure $CH_2=C<$ and, in most cases, have at least one of the disconnected valences attached to an electronegative group, that is, a group which increases the polar character of the molecule, such as a chlorine group or an organic group containing a double or triple bond such as vinyl, phenyl, cyano, carboxy, or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alphamethylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinyl acetate, vinyl chloride, vinylidene chloride, vinylfurane, vinylcarbazole, vinylacetylene and other unsaturated hydrocarbons, esters, alcohols, acids, ethers, etc., of the types described.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith, such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed with reference to these typical reactants.

It is frequently desirable to include water-soluble components in the aqueous phase, particularly when the polymerization temperatures are below freezing. Inorganic salts and alcohols can be so used. Alcohols which are applicable, when operating at low temperatures, include water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase.

The total pressure on the reactants is preferably at least as great as the total vapor pressure of the mixture, so that the initial reactants will be present in liquid phase.

Emulsifying agents which are applicable in the practice of this invention are fatty acid soaps such as potassium laurate, potassium oleate, and the like. Salts of rosin acids and other emulsifying agents such as nonionic emulsifying agents, e.g., salts of alkyl aromatic sulfonic acids, salts of alkyl sulfates, and the like, which will produce favorable results under the conditions of the reaction, can also be used. The amount of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material is sufficient.

Preferred polymerization modifiers are alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, if any, and the results desired. In general, the greater modification is obtained when operating at low temperatures and therefore a smaller amount of mercaptan is added to yield a product of a given Mooney value than is used at higher temperatures. In the case of tertiary mercaptans, such as tertiary $C_{12}$ mercaptans, blends of tertiary $C_{12}$, $C_{14}$ and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus, the amount of mercaptan is adjusted to suit the case at hand.

Referring now to the drawing in detail and to FIGURE 1 in particular there is shown a butadiene storage tank 10 which is supplied with fresh butadiene through a line 11 and recycle butadiene through a line 12. The mixture of fresh and recycle butadiene is removed from tank 10 through a line 13 which enters a caustic scrubber column 14. Fresh caustic is added to column 14 through a line 16 and spent caustic is removed from column 14 through a line 17. Fresh caustic is added and the spent caustic is removed at rates sufficient to maintain approximately a ten percent aqueous caustic solution in column 14.

An oxygen removing agent, which preferably is tertiary butyl catechol, is supplied to the budadiene feed to column 14 by a line 20 which communicates wtih line 13. The tertiaryl butyl catechol is normally dissolved in styrene at the ratio of approximately thirty pounds of tertiary butyl catechol to one hundred gallons of styrene. This agent is delivered through line 20 at a set rate that is maintained by a rate-of-flow controller 21 which adjusts a valve 22 in line 20.

The butadiene stream removed from scrubber 14 is passed through a line 23 at a constant rate that is maintained by a rate-of-flow controller 24 which adjusts a valve 25 in line 23. A sample of the butadiene stream is removed from line 23 by a line 26 which enters an oxygen analyzer 27. The sample stream is vented from analyzer 27 through a line 28. The output signal from analyzer 27 resets rate-of-flow controller 21 in a manner described in detail hereinafter.

The various other materials employed in the copolymerization are added to line 23 through lines 30, 33, 37, 40 and 44 at predetermined rates. For example, the emulsifying agent is added to line 23 through a line 30 which has a rate-of-flow controller 31 associated therewith that adjusts a valve 32. The styrene and water are added to line 23 through a line 33 which has a rate-of-flow controller 34 associated therewith that adjusts a valve 35. Obviously, the water could be added with other materials or through a separate line. The modifier is added to line 23 through a line 37. Flow through line 37 is maintained by rate-of-flow controller 38 which adjusts a valve 39. The activator is added to line 23 through a line 40. Line 40 has a rate-of-flow controller 41 associated therewith which adjusts a valve 42. The output signal from analyzer 27 resets rate-of-flow controller 41 as described in detail hereinafter. The oxidant is added to line 23 through a line 44 which has a rate-of-flow controller 45 associated therewith. Rate-of-flow controller 45 adjusts a valve 46. The combined streams are directed into a first reactor 50. Of course, the various streams can be added directly into reactor 50. From reactor 50, the materials being polymerized are circulated through a plurality of reactors 51, 52, etc.

Figure 2:
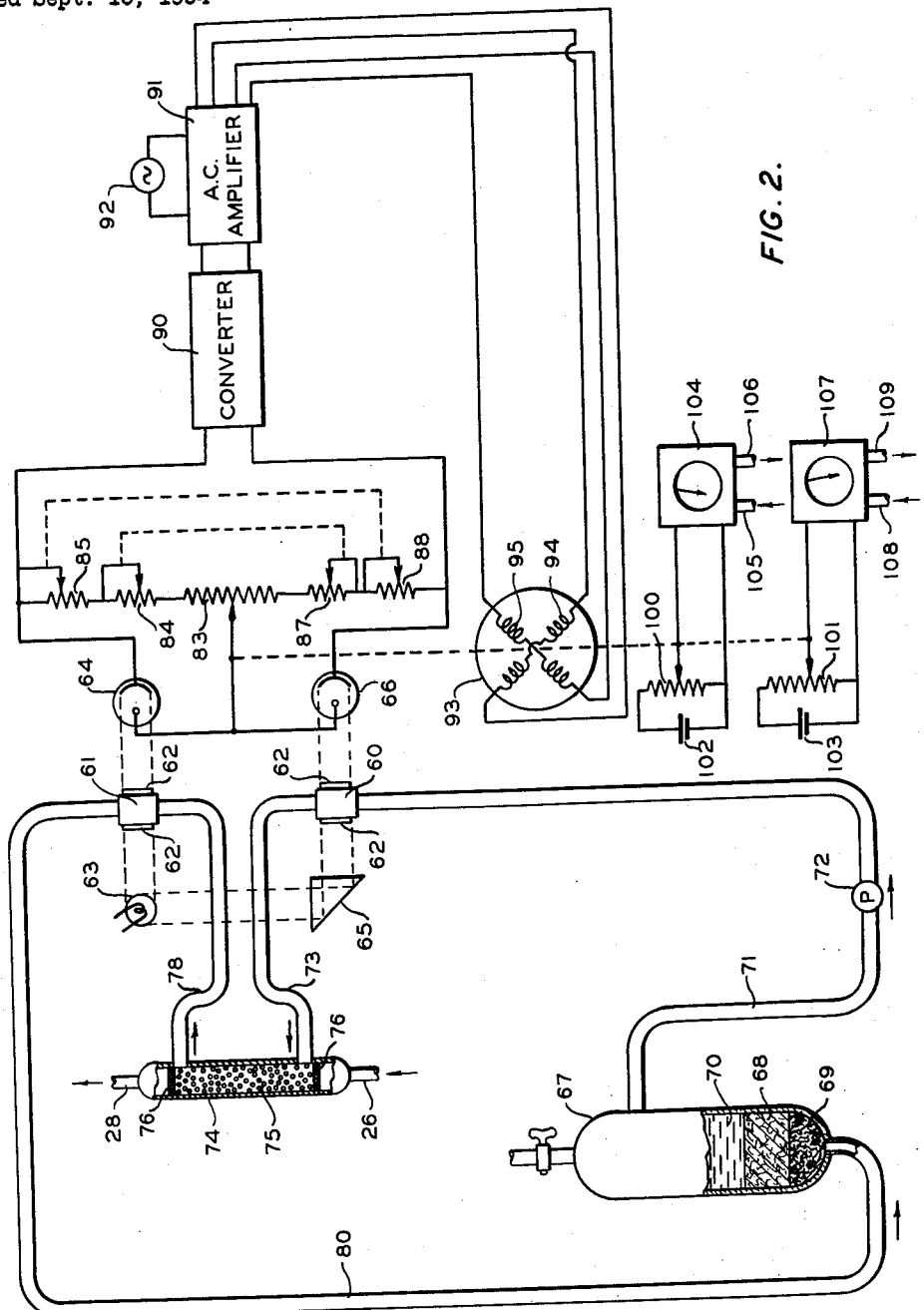
FIGURE 2 is a schematic view of the oxygen analyzer employed in conjunction with this invention.

Oxygen analyzer 27 is illustrated in detail in FIGURE 2. This analyzer is based upon the discovery that a reduced aqueous solution of sodium anthraquinone-$\beta$-sulfonate is red in color whereas such a solution becomes white when oxidized. The oxygen analyzer comprises a pair of sample cells 60 and 61 having transparent windows 62. A first beam of radiation from a light source 63 is directed through cell 61 to impinge upon a photovoltaic cell 64. A second beam of radiation from source 63 is reflected by a prism 65 through cell 60 to impinge upon a second photovoltaic cell 66. In this manner the two cells compare the light transmitted through the respective sample cells.

A regeneration column 67 contains a mass of amalgamated zinc 68 which functions to reduce a solution of sodium anthraquinone-$\beta$-sulfonate. The amalgamated zinc 68 is supported by a cushion of glass wool 69. The upper portion of column 67 contains the sulfonate solution 70 which is directed through a line 71 by a pump 72 to the inlet port of sample cell 60. The outlet port of sample cell 60 is connected by a line 73 to the inlet of a column 74 which is filled with a material having a large surface area, such as glass balls 75. These balls are retained within column 74 by fritted filter discs 76 at the two ends of the column. The sample stream removed through line 26 in FIGURE 1 is vaporized and directed into column 74 to contact the sulfonate solution therein. The oxidized sulfonate solution is removed from column 74 through a line 78 which communicates with the inlet port of sample cell 61. The outlet port of sample cell 61 is connected by line 80 back to the regeneration column 67. The reduced sulfonate solution circulated through sample cell 69 is red in color. This color is reduced in intensity in column 74, however, in relation to the amount of oxygen present in the sample stream circulated through column 74 between lines 26 and 28. The color of the stream circulated through sample cell 61 is thus related to the oxygen content of the sample stream. The two colors are compared by radiation transmitted through cells 69 and 61.

Corresponding first terminals of photocells 64 and 66 are connected to one another and to the contactor of a potentiometer 83. One end terminal of potentiometer 83 is connected to the second terminal of cell 64 through series connected variable resistors 84 and 85. The second terminal of potentiometer 83 is connected to the second terminal of cell 66 through series connected variable resistors 87 and 88. The second terminals of cells 64 and 66 are connected to the respective input terminals of a converter 90 which provides an alternating current signal of magnitude proportional to the voltage difference applied thereto. The wipers of resistors 84 and 85 are mechanically coupled to one another to provide a zero adjustment of the bridge circuit. The wipers of resistors 85 and 88 are mechanically coupled to one another to adjust the sensitivity of the detecting circuit.

The output signal of converter 90 is applied to the input terminals of an alternating current amplifier unit 91 which is energized from a voltage source 92. A first signal from unit 91 is applied across a first winding 95 of a reversible motor 93. This first signal is proportional to the output signal from converter 90. A second signal from amplifier unit 91 is applied across a second winding 94 of motor 93. This second signal is obtained directly from voltage source 92. The two signals are maintained 90° out of phase with one another. The degree of rotation of motor 93 is a function of the magnitude of the output signal from 90 whereas the direction of rotation of motor 93 is determined by the phase of the output signal from converter 90. The drive shaft of motor 93 is mechanically coupled to the contactor of potentiometer 83 so that the contactor of potentiometer 83 is adjusted by motor 93 to restore the bridge circuit to a balanced condition. The position of the contactor of potentiometer 83 is therefore a measurement of the difference in intensity of radiation impinging upon cells 64 and 66.

The drive shaft of motor 93 is also coupled to the contactors of first and second telemetering potentiometers 100 and 101. Voltage sources 102 and 103 are applied across the end terminals of respective potentiometers 100 and 101. The voltage appearing between the contactor and one end terminal of potentiometer 100 is applied to a recorder-controller 14 which can be a pneumatic instrument supplied with air at a predetermined pressure by a line 105. The air pressure in outlet line 106 is a function of the voltage applied to recorder 104. The air pressure in line 106 is applied to rate-of-flow controller 21 of FIGURE 1 to reset this instrument as required. The voltage appearing between the contactor and one end terminal of potentiometer 101 is applied to a second recorder-controller 107 which is similar to controller 104. Air is supplied to controller 107 by a line 108, and the output air pressure is applied through a line 109 to reset controller 41 of FIGURE 1.

As previously mentioned, it is desired to maintain the concentration of the caustic solution in scrubber 14 constant at approximately ten percent. The tertiary butyl catechol added through line 20 is adjusted as required to keep the oxygen content in the butadiene stream in line 23 within predetermined limits. Since the tertiary butyl catechol is rather expensive it is important to regulate the addition of this material to prevent waste. In accordance with the present invention controller 21 is adjusted such that tertiary butyl catechol is added to scrubber 14 at the minimum rate required to keep the oxygen content within the desired limits. In general, approximately 2.5 pounds of tertiary butyl catechol will remove one pound of oxygen. In addition to the tertiary butyl catechol other oxygen removing agents can be supplied to scrubber 14 through line 20. One agent that is satisfactory and relatively inexpensive is sodium hydrosulfite. Approximately nine pounds of this latter agent will remove one pound of oxygen. Furthermore, the oxygen removal system of this invention can be used with other hydrocarbon streams. Oxygen removal from olefin streams such as ethylene or propylene is important in the polymerization of these materials.

Figure 3:
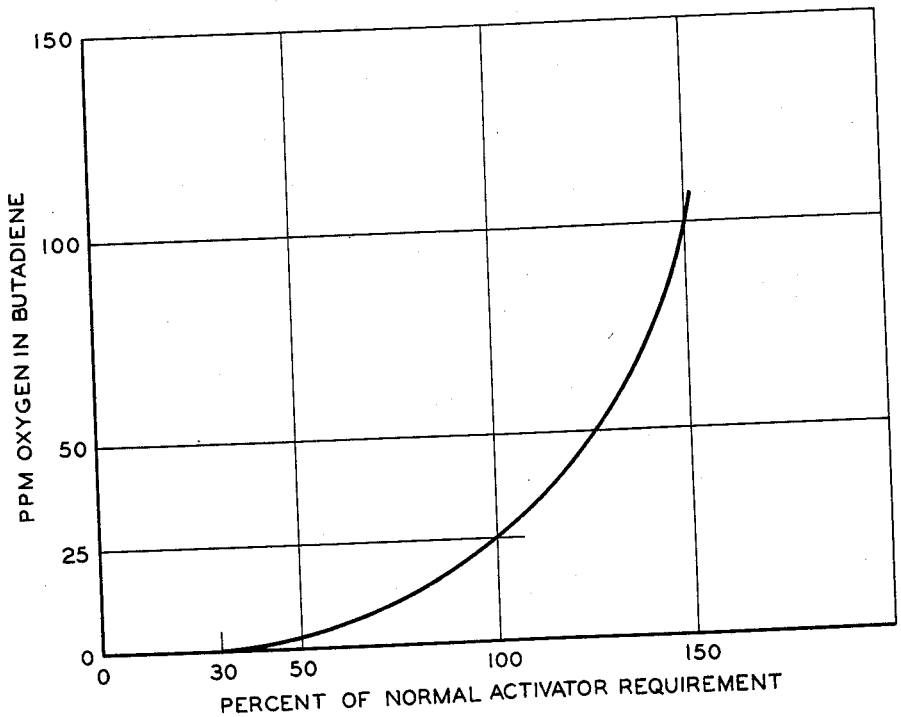
FIGURE 3 is a graphical representation of the activator requirement as a function of the oxygen present in the butadiene to be reacted.

If it is not possible or economical to maintain the oxygen content within preselected limits by control of scrubber 14, then a second control system is provided to vary the amount of initiator employed in the polymerization recipe. I have discovered that the rate of polymerization can be maintained at the desired value even though oxygen is present in the butadiene. This is accomplished by adding an increased amount of activator to the recipe. The amount of activator required for a particular polymerization recipe is illustrated in FIGURE 3 of the drawing. This curve was plotted from analyses of the oxygen content in butadiene in a commercial scale reactor using the following polymerization recipe:

|  | Parts by weight |
|---|---|
| Butadiene | 72. |
| Styrene | 28. |
| Water | 180. |
| Potassium salt of rosin-acid soap | 4.5. |
| Tri-sodium phosphate | 0.8 maximum. |
| Ferrous sulfate heptahydrate } Activator | { 0.2. |
| Potassium pyrophosphate | { 0.22. |
| Para-menthane hydroperoxide | 0.15. |
| Tertiary dodecyl mercaptan | As required for desired Mooney viscosity. |
| Sodium salt of condensed sulfonic acid | 0.15. |
| Sodium salt of ethylene diamine-tetra-acetic acid | 0.02 maximum. |

The reactions were carried out at 5° C. to a conversion of approximately 60%.

From an inspection of the curve of FIGURE 3 it can be seen that as long as the oxygen content in the butadiene remains below approximately twenty-five parts per million, the normal quantity of activator (as indicated above) is sufficient to maintain the desired polymerization rate. However, as the oxygen content increases above twenty-five parts per million, the amount of activator needed increases rapidly. The activator rate is adjusted automatically by controller 41. It generally is not practical to increase the activator above approximately 150 percent of the normal requirement. However, the combined control systems of this invention are capable of keeping the oxygen content well within this limit. If oxygen is present in any of the materials other than butadiene, then a second analyzer 27 can be used with its inlet line 26 connected downstream from the oxygen addition. This second analyzer can adjust controller 41 in place of the illustrated analyzer.

The control system of this invention is also applicable to polymerization recipes employing other types of activators such as a peroxamine, tetraethylenepentamine, for example. A recipe using such an activator is as follows:

| | Parts by weight |
|---|---|
| Butadiene | 70 |
| Styrene | 30 |
| Water | 180 |
| Potassium salt of rosin-acid soap | 4.5 |
| Potassium chloride | 0.5 |
| Potassium hydroxide | 0.13 |
| t-Dodecyl mercaptan | 0.20 |
| t-Butylisopropylbenzene hydroperoxide | 0.104 |
| Tetraethylenepentamine | 0.10 |

The tetraethylenepentamine is increased in response to an increase in oxygen in the butadiene.

From the foregoing description it can be seen that there is provided in accordance with this invention an improved control system for polymerization reactions. This system involves maintaining the oxygen content in a hydrocarbon stream within preselected limits by controlling the addition of an oxygen removing agent thereto in response to an analysis of the hydrocarbon stream which determines the oxygen content. Furthermore, a system is provided to modify a polymerization recipe by increasing the amount of activator added to compensate for oxygen present in the materials being reacted. This compensation is carried out in an automatic manner by an oxygen analyzer.

While this invention has been described in conjunction with a present preferred embodiment, it should be apparent that the invention is not limited thereto.

What is claimed is:

1. In the production of a polymeric material of high molecular weight by the polymerization in an aqueous emulsion of a monomeric material comprising a major amount of a polymerizable 1,3-diolefin and a minor amount of an unsaturated organic compound copolymerizable therewith in aqueous emulsion, said polymerization being conducted in the presence of a redox composition comprising an oxidant, a reductant and an activator; the steps of analyzing the materials being polymerized to determine the oxygen content thereof, and adjusting the amount of activator employed in the polymerization in response to the analysis by increasing the addition of activator when the measured oxygen content exceeds a predetermined value so that the reaction takes place at a preselected rate.

2. The method in accordance with claim 1 wherein said 1,3-diolefin is butadiene and the activator added to said reactor is increased over the amount normally added whenever the measured oxygen exceeds approximately twenty-five parts per million parts of butadiene.

3. The method in accordance with claim 1 wherein said activator is selected from the group consisting of an iron pyrophosphate and a peroxamine.

4. The method in accordance with claim 1 wherein said activator is an iron pyrophosphate.

5. The method in accordance with claim 1 wherein said activator is tetraethylenepentamine.

6. A method of producing a polymeric material of high molecular weight by the polymerization in an aqueous emulsion of a monomeric material comprising a major amount of a polymerizable 1,3-diolefin and a minor amount of an unsaturated organic compound copolymerizable therewith in an aqueous emulsion which comprises passing an oxygen contaminated polymerizable 1,3-diolefin to a contacting zone, passing an oxygen removing agent to said contacting zone, removing a 1,3-diolefin stream from said contacting zone and passing same into a reaction zone, passing an unsaturated organic compound copolymerizable with said 1,3-diolefin into said reaction zone, passing water and an emulsifying agent into said reaction zone, passing an oxidant into said reaction zone, passing a reductant into said reaction zone, passing an activator into said reaction zone, passing a stream of 1,3-diolefin removed from said contacting zone to an oxygen analyzing zone wherein a signal is provided representative of the oxygen present in the 1,3-diolefin passed to the analyzing zone, applying said signal to adjust the rate of addition of said oxygen removing agent into said contacting zone to tend to maintain the oxygen content of the 1,3-diolefin removed from said contacting zone within selected limits, and applying said signal to adjust the addition of said activator into said reaction zone so that the addition of said activator is increased when the measured oxygen content exceeds a preselected value.

7. A method of producing a polymeric material of high molecular weight by the polymerization in an aqueous emulsion of a monomeric material comprising a major amount of a polymerizable 1,3-diolefin and a minor amount of an unsaturated organic compound copolymerizable therewith in an aqueous emulsion which comprises passing a stream of oxygen contaminated polymerizable 1,3-diolefin to a reaction zone, passing an unsaturated organic compound copolymerizable with said 1,3-diolefin into said reaction zone, passing water and an emulsifying agent into said reaction zone, passing an oxidant into said reaction zone, passing a reductant into said reaction zone, passing an activator into said reaction zone, passing at least a portion of said stream to an oxygen analyzing zone wherein a signal is provided representative of the oxygen in the stream passed to the analyzing zone, and applying said signal to adjust the addition of said activator into said reaction zone so that the addition of said activator is increased when the measured oxygen content exceeds a preselected value.

References Cited in the file of this patent

UNITED STATES PATENTS

| 1,918,370 | Beckmann et al. | July 18, 1933 |
| 2,375,730 | Caldwell et al. | May 8, 1945 |
| 2,386,831 | Wright | Oct. 16, 1945 |
| 2,497,828 | Young | Feb. 14, 1950 |
| 2,563,598 | Fuqua et al. | Aug. 7, 1951 |
| 2,803,623 | Anderson | Aug. 20, 1957 |
| 2,816,096 | Fauske | Dec. 10, 1957 |
| 2,818,457 | MacDonald | Dec. 31, 1957 |
| 2,837,502 | Hanmer et al. | June 3, 1958 |

OTHER REFERENCES

Hobson et al.: Ind. Eng. Chem., vol. 42, 1572–7, August 1950.

Johnson et al.: J. Am. Chem. Soc., 74, 3105–9, June 1952.